United States Patent
Ray et al.

(10) Patent No.: US 7,301,446 B2
(45) Date of Patent: Nov. 27, 2007

(54) METHOD OF DETECTING UNDERSIZED, OVERSIZED, UNDERINFLATED OR OVERINFLATED TIRES

(75) Inventors: E. David Ray, White Lake, MI (US); Dan Reich, Macomb Township, MI (US); Todd Ferguson, Fenton, MI (US)

(73) Assignee: BorgWarner, Inc., Auburn Hills, MI (US)

( * ) Notice: Subject to any disclaimer, the term of this patent is extended or adjusted under 35 U.S.C. 154(b) by 330 days.

(21) Appl. No.: 11/125,459

(22) Filed: May 10, 2005

(65) Prior Publication Data
US 2006/0255924 A1  Nov. 16, 2006

(51) Int. Cl.
*B60C 1/00* (2006.01)

(52) U.S. Cl. ............... 340/444; 340/442; 340/443; 340/445; 340/446; 340/447; 73/146; 73/146.5

(58) Field of Classification Search ............... 340/442, 340/443, 444, 445, 446, 447; 73/146, 146.5
See application file for complete search history.

(56) References Cited

U.S. PATENT DOCUMENTS

| | | | |
|---|---|---|---|
| 5,292,184 A | 3/1994 | Takata | |
| 5,461,568 A | 10/1995 | Morita | |
| 5,492,194 A | 2/1996 | McGinn et al. | |
| 5,578,984 A | 11/1996 | Nakajima | |
| 5,589,815 A | 12/1996 | Nishihara et al. | |
| 5,721,528 A | 2/1998 | Boesch et al. | |
| 5,927,425 A | 7/1999 | Kusano | |
| 6,002,327 A | 12/1999 | Boesch et al. | |
| 6,251,045 B1 | 6/2001 | Oliveira et al. | |
| 6,285,280 B1 | 9/2001 | Wang | |
| 6,834,543 B2 * | 12/2004 | Kin et al. ............... | 73/146 |

* cited by examiner

*Primary Examiner*—Daryl C Pope
(74) *Attorney, Agent, or Firm*—Brinks Hofer Gilson & Lione; William G. Anderson

(57) ABSTRACT

A method of detecting the presence of an undersized, e.g., mini-spare, or an underinflated, oversized or overinflated tire or tires on a passenger motor vehicle improves operation of traction control, stability and anti-lock brake systems by compensating for such operating anomalies. The method includes the steps of sensing the steering angle, sensing the actual rotational speeds of each wheel, determining the actual vehicle speed, calculating each expected wheel speed based upon the sensed steering angle and wheel speeds, calculating each tire diameter based upon the calculated wheel speeds and, finally, determining whether such diameters are within various defined ranges which permit normal operation, permit reduced function operation, or require system shut down.

20 Claims, 4 Drawing Sheets

METHOD OF DETECTING UNDERSIZED, OVERSIZED, UNDERINFLATED OR OVERINFLATED TIRES

BACKGROUND OF THE INVENTION

The invention relates generally to software for a passenger motor vehicle microprocessor and more specifically to software embodying a method for determining when an undersized, oversized, underinflated or overinflated tire or tires are being utilized on a motor vehicle.

Modern space and weight restrictions on passenger motor vehicles have rendered it common for them to be equipped with a mini-spare which has a diameter significantly smaller than the regular or standard vehicle tires. This smaller diameter will cause the tire to rotate at a considerably higher angular velocity or rotational speed than the other, standard, e.g., OEM, tires. Higher angular velocity of a tire can also be caused by a flat tire, an underinflated tire or a tire having, for any reason, a smaller effective or operating diameter. Similarly, an oversized tire or one that is overinflated will rotate more slowly as it exhibits a larger effective diameter.

Depending upon the magnitude of the difference of a particular tire's angular velocity or rotational speed relative to the other tires on a vehicle, performance enhancing systems such as traction control systems and anti-skid systems may exhibit impaired performance. This is because in many systems, front-to-rear or side-to-side wheel (tire) speed differences are the primary control parameters. Hence, an anomaly or offset in the front-to-rear or side-to-side wheel speeds would be interpreted falsely as indicating that the wheels and thus the vehicle are experiencing slip. Depending upon the magnitude of the difference and the sensitivity of the system, this situation may cause false or premature activation of the corrective system and components during driving conditions such as straight line or certain cornering maneuvers which would not normally activate the system.

Accordingly, it is desirable to detect the presence of a mini-spare, a non-standard size tire, an underinflated tire or an overinflated tire so that the performance enhancing system can make appropriate adjustments to reduce or eliminate false or premature system operation.

SUMMARY OF THE INVENTION

A method of detecting the presence of an undersized, e.g., mini-spare, or an underinflated, oversized or overinflated tire or tires on a passenger motor vehicle improves operation of traction control, stability and anti-lock brake systems by compensating for such operating anomalies. The method includes the steps of sensing the steering angle, sensing the actual rotational speed of each wheel, determining the actual vehicle speed, calculating each expected wheel speed based upon the sensed steering angle and wheel speeds, calculating each tire diameter based upon the calculated wheel speeds, updating or correcting the expected wheel speeds based upon the calculated diameters and finally determining whether such diameters are within various defined ranges which permit normal operation, permit reduced function operation, or require system shut down. An additional step detects increasing tire diameter(s) with increasing speed which indicates an underinflated tire or tires.

Thus it is an object of the present invention to provide a method for detecting mini-spares or underinflated or overinflated tires on passenger motor vehicles.

It is a further object of the present invention to provide a method for detecting mini-spares or underinflated or overinflated tires on passenger motor vehicles equipped with performance enhancing systems.

It is a still further object of the present invention to provide a method for detecting out of tolerance tires on passenger motor vehicles equipped with performance enhancing systems and reducing or eliminating false or premature activation of such system.

These and other aspects and advantages of the present invention will become apparent by reference to the following description of the preferred embodiment and drawings where like reference numbers refer to the same component, element or feature.

DETAILED DESCRIPTION OF THE PREFERRED EMBODIMENT

Figure 1:
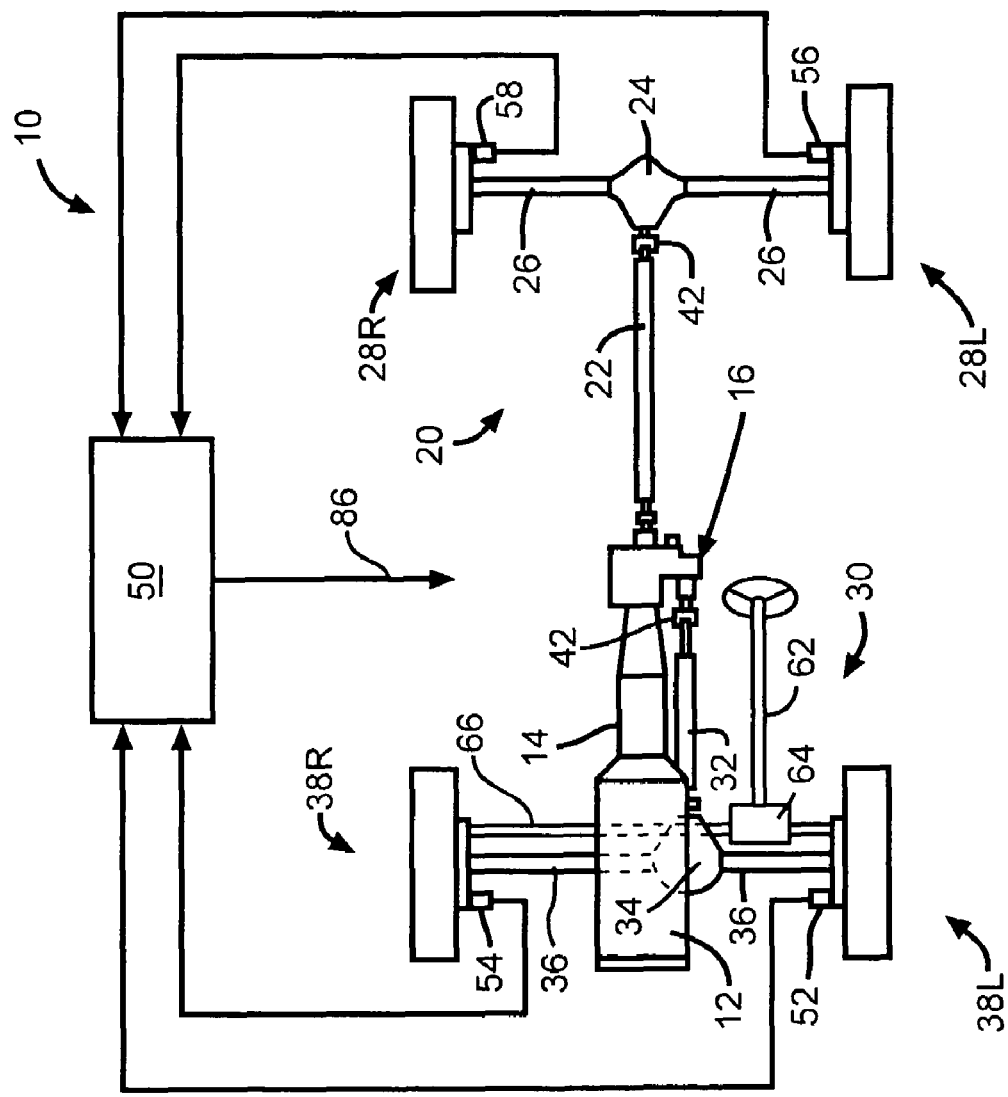
FIG. 1 is a diagrammatic plan view of a four wheel drive train of a typical passenger vehicle such as a passenger car, sport utility vehicle, pickup truck or crossover vehicle.

Referring now to FIG. 1, a drive train of a typical four-wheel drive vehicle with which the present invention may be utilized is diagrammatically illustrated and designated by the reference number 10. The four-wheel vehicle drive train 10 includes a prime mover 12 such as an internal combustion gasoline or Diesel engine or a hybrid, i.e., internal combustion engine and electric motor drive. The prime mover 12 is coupled to and directly drives a transmission 14 which may be either an automatic, continuously variable or manual type. The output of the transmission 14 directly drives a transfer case assembly 16 which provides motive power to a primary or rear drive line 20 comprising a primary or rear prop shaft 22, a primary or rear differential assembly 24, a pair of live primary or rear axles 26 and a respective pair of left and right primary or rear tire and wheel assemblies 28L and 28R. The transfer case assembly 16 also selectively provides motive power to a secondary or front drive line 30 comprising a secondary or front prop shaft 32, a secondary or front differential assembly 24, a pair of live secondary or front axles 36 and a respective pair of left and right secondary or front tire and wheel assemblies 38L and 38R.

Both the primary drive line 20 and the secondary drive line 30 may include suitable and appropriately disposed universal joints 42 which function in a conventional fashion to allow static and dynamic offsets and misalignments between the various shafts and components.

The drive train 10 also includes a controller or microprocessor 50 which receives data in the form of electrical signals from various sensors disposed about the vehicle and the drive train 10, incorporates or embodies various software or computer programs to accept, condition and process such signals and provide outputs to other devices such as other computational modules or microprocessors, control devices, the car area network (CAN), indicator lights and the like. The controller or microprocessor 50 may be a dedicated or stand alone device or may be a component or section of a larger controller or processor (not illustrated) within the vehicle. The controller or microprocessor 50 receives signals regarding the rotational speeds of each of the vehicle tire and wheel assemblies 28L, 28R, 38L and 38R which may be available from a common vehicle bus (e.g., the CAN) which feeds, for example, anti-lock brake controllers, traction controllers or other similar systems (not illustrated).

Whether obtained from a common vehicle bus or otherwise, the signals are provided by a first left front tire and wheel speed sensor 52 which is preferably a Hall effect sensor but which may also be a variable reluctance or other sensor providing good signal definition, low speed accuracy and long service life. A second right front tire and wheel speed sensor 54 senses the speed of the right front tire and wheel assembly 38R, a third wheel speed sensor 56 senses the rotational speed of the left rear tire and wheel assembly 28L and a fourth tire and wheel speed sensor 58 senses the rotational speed of the right rear tire and wheel tire assembly 28R. As noted, all of these signals are provided to the microprocessor 50. A moving component or feature of the steering assembly such as a steering column 62 is sensed by a steering angle or rotation sensor 64 which provides data to the microprocessor 50 regarding the angular position of the steering column 62 or the linear position of a steering linkage 66 and thus the angular position of the front tire and wheel assemblies 38L and 38R. It will be appreciated that the sensor 64 may be connected or coupled to any member or feature of the steering apparatus which moves as the steering wheel, steering column 62, steering linkage 66 and steered wheels 38L and 38R move. Since there is typically a direct and positive linkage between the steering column 62 and the front (steering) tire and wheel assemblies 38L and 38R, the angular position of the front tire and wheel assemblies 38L and 38R can be directly inferred and, in fact, computed from the information provided by the steering angle sensor 64. Thus, it should be understood that rotation of the steering column 62 and movement of the steering angle sensor 64 will always correspond, according to a known mathematical relationship, to the angular movement of the front tire and wheel assemblies 38L and 38R. This is true of even variable ratio steering systems. Scaling factors in the microprocessor 50 can readily convert angular position of the steering column 52 to angular position of the front (steering) tire and wheel assemblies 38L and 38R.

Due to such ready conversions, references herein to "steering angle," mean the angular position of the steering column 62 and associated steering wheels, it being understood that both the angle of the steering column 62 and the angle or deflection of the front tire and wheel assemblies 38L and 38R of a given vehicle are related by a known relationship or ratio, as noted above, and that either may be sensed, if desired, and scaled and converted to the other as appropriate. In this regard, either a linear sensor (not illustrated) operably linked to a steering rack or other steering component exhibiting linear motion or an angular sensor having limited motion linked to a steering component having correspondingly limited motion will function in this system. Lastly, in steer-by-wire systems, the microprocessor 50 may be fed a signal from the steering angle sensor 64 of the steer-by-wire system. All of these sensor types, sensor locations and steering configurations are deemed to be within the scope of this invention. It should be appreciated, however, that the relatively significant extent of rotation of the steering column 62, typically at least three turns (1080°) lock-to-lock, provides better angular definition in the output signal of the sensor 64 relative to a sensor location exhibiting relatively less rotational or linear movement. Regardless of what moving component or feature is sensed, the data from the sensor 64 can be readily converted or scaled to any desired format to indicate a desired variable (steering wheel angular position or angular position of the steering or front tire and wheel assemblies 38L and 38R). The microprocessor provides signal outputs to the CAN or specific systems or controllers (not illustrated) in a line or bus 68.

Figure 2A:
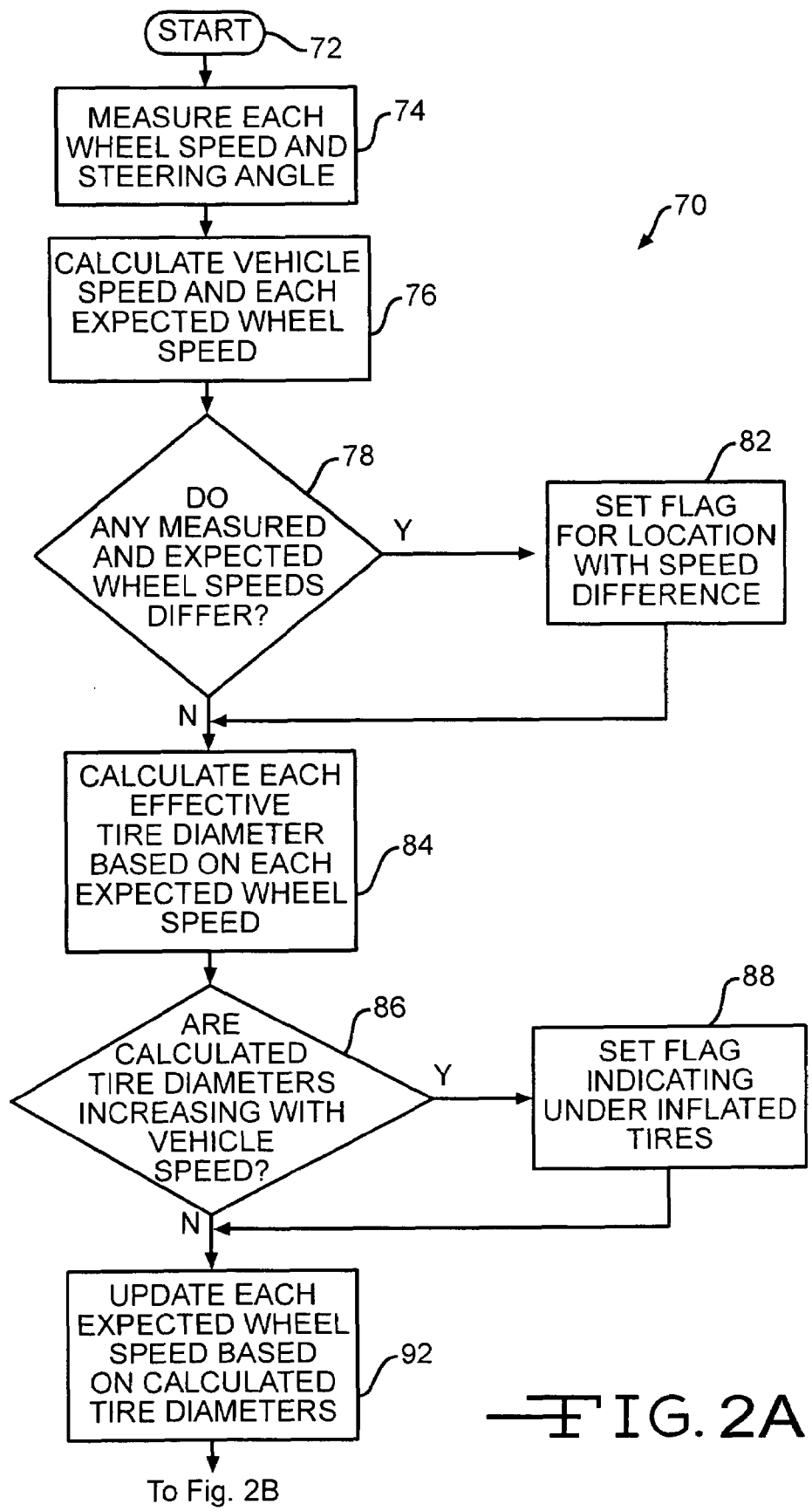
FIG. 2A is the first portion of a software or computer program flow chart illustrating the steps of a method according to the present invention.
Figure 2B:
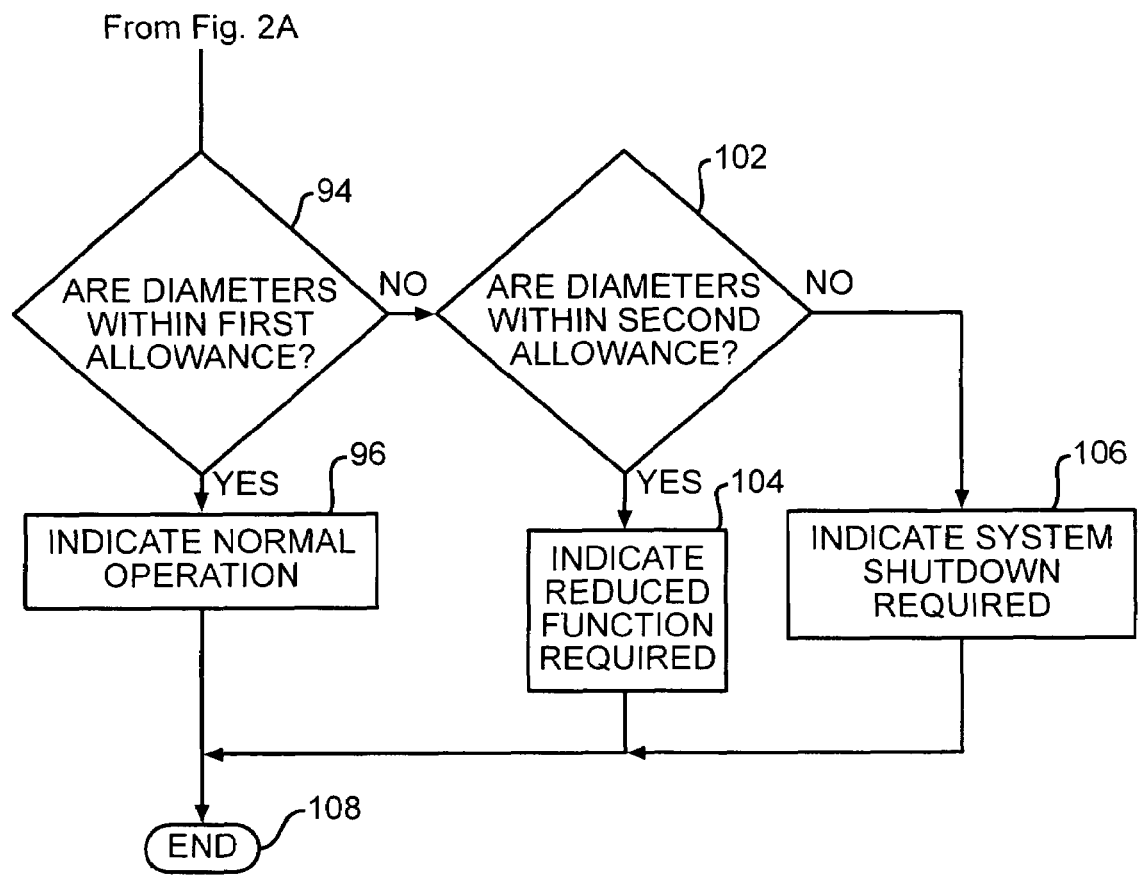
FIG. 2B is the second portion of a software or computer program flow chart illustrating the steps of a method according to the present invention.

Referring now to FIG. 2, the software steps or computational routine or program undertaken by the microprocessor 50 to detect one or more undersized tires such as a mini-spare, an underinflated tire, an undersized, underinflated tire, an oversized tire, an overinflated tire or an oversized, overinflated tire are illustrated and designated by the reference number 70. For purposes of simplicity and to conveniently encompass these and other tire conditions resulting from one or more tires having operating or effective diameters different from the other proper or standard diameter tires on a vehicle, this situation or condition will be referred to herein as an "anomalous" or "non-standard" tire diameter or an "anomalous" or "non-standard" tire.

The software or program 70 starts with an initializing step 72. On a new ignition cycle, the initializing step 72 will typically set all data registers to zero. Upon second and subsequent iterations during an ignition cycle, it will read current data stored in such registers. The program 70 then proceeds to a data gathering, process step 74 wherein the four wheel speed sensors 52, 54, 56 and 58 as well as the steering angle sensor 64 are polled such that current, real time data is provided to subsequent computational steps regarding the current angular velocity, i.e., rotational speed of each of the tire and wheel assemblies 28L, 28R, 38L and 38R as well as the steering angle.

The program 70 then moves to a process step 76 which calculates the vehicle speed and expected speeds of each of the tire and wheel assemblies 28L, 28R, 38L and 38R. The vehicle speed calculation of process step 76 preferably utilizes data from the two undriven wheels in a two wheel drive vehicle or the two intermittently driven wheels in an adaptive four wheel drive vehicle, i.e., the front tire and wheel assemblies 38L and 38R in a vehicle such as that illustrated in FIG. 1, on the assumption that these wheels are less subject to slipping as they are either not or only intermittently driven. In a full time four wheel drive vehicle, the speeds of all four wheels are utilized in the calculation. In all cases, the data is averaged to arrive at a current vehicle speed.

Calculation of the expected wheel speeds utilizes the sensed steering angle and trigonometric functions as well as fixed or stored data regarding the wheel base and track of the particular vehicle to precisely calculate, based upon the calculated vehicle speed, and steering angle, if any, what the precise speed of each of the vehicle tire and wheel assemblies 28L, 28R, 38L and 38R should be. For example, if the steering angle is zero or straight ahead, all four tire and wheel assemblies 28L, 28R, 38L and 38R should be rotating at the same speed based on the calculated (averaged) vehicle speed. If the steering angle sensor 64 indicates that the vehicle is turning to the left or the right, the process step 76 will compute what the rotational speed of each tire and wheel assembly 28L, 28R, 38L and 38R should be based upon the calculated speed of the vehicle, the steering angle and trigonometric relationships based upon the steering angle, the vehicle wheel base and the vehicle track as noted.

Figure 3:
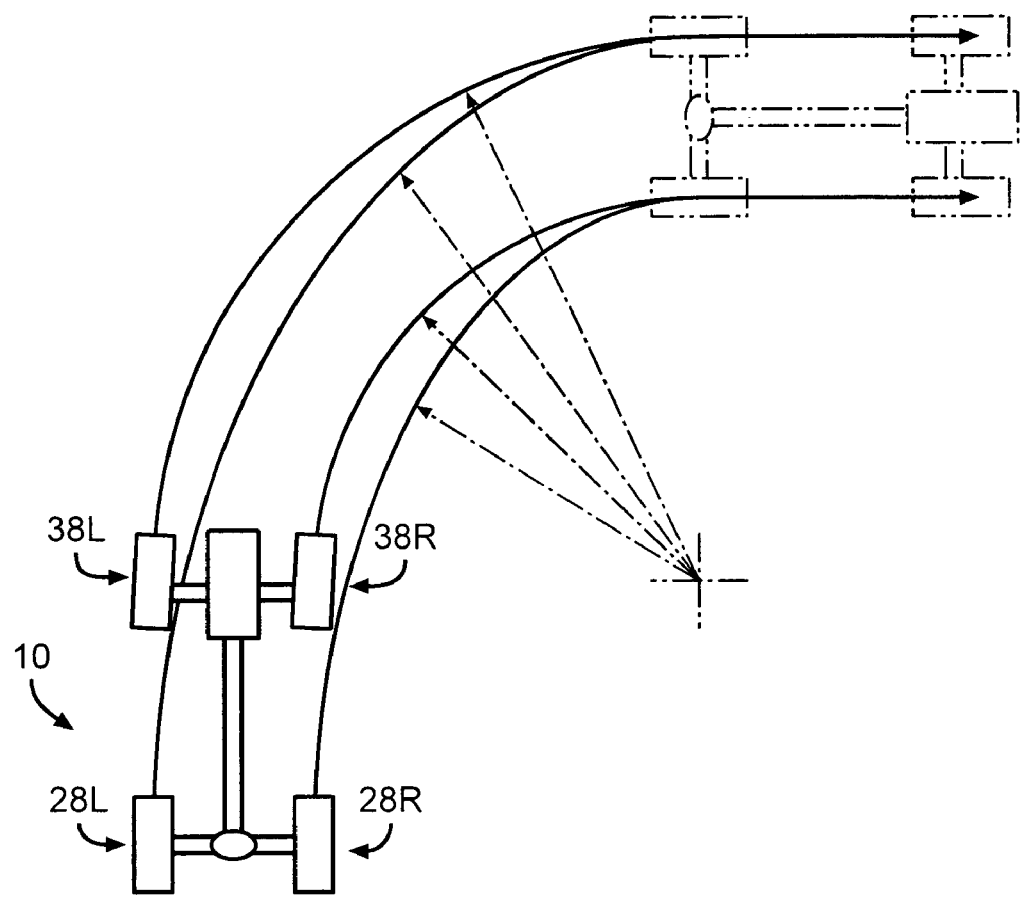
FIG. 3 is a diagrammatic plan view of a motor vehicle undertaking a right turn which generally illustrates the steering angle and the distinct turning radii of each tire and wheel assembly.

With reference briefly to FIG. 3, if the vehicle is turning to the right, the expected rotational speeds of the tire and wheel assemblies 28L and 38L on the left side of the vehicle will be higher and the expected rotational speeds of the tire and wheel assemblies 28R and 38R on the right side of the vehicle will be lower in accordance with the trigonometric relationships relating to the turning radius established or inferred by data provided by the steering angle sensor 64. Similarly, and on any turn, the front tire and wheel assemblies 38L and 38R will be rotating slightly faster than the corresponding rear tire and wheel assemblies 28L and 28R as they describe larger or longer radii arcs. Accordingly, on a right turn the slowest rotating tire and wheel assembly will be the right rear tire and wheel assembly 28R and the fastest rotating tire and wheel assembly will be the left front tire and wheel assembly 38L.

Next, the program 70 moves to a decision point 78 which compares each measured wheel speed with each corresponding expected wheel speed and determines whether any differences between these speeds exists and, if so, whether these differences exceed a predetermined value or tolerance. This is achieved by continuously generating four sets of reference speeds: one assuming that a mini-spare is mounted on the left front, another assuming that a mini-spare is mounted on the right front and so on. If the difference between any of the measured and expected wheel speeds differ by more than the predetermined value at any wheel location, the decision point 78 is exited at YES and a flag is set in a process step 82 to indicate to associated systems or the CAN the location of an anomalous or non-standard, e.g., mini-spare, tire. Alternatively, an indicator light may be illuminated to indicate to the vehicle operator that a non-standard tire or mini-spare is currently on the vehicle. The flag of process step 82 will be reset to zero or OFF at the beginning of a new ignition cycle. If all measured and expected wheel speeds are with the predetermined tolerance, the decision point is exited at NO and the program 70 proceeds to a process step 84.

Figure 4:
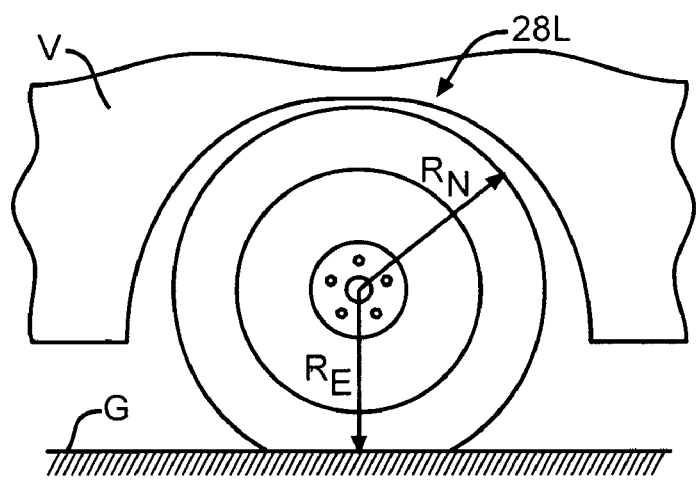
FIG. 4 is a side elevational view of a tire and wheel assembly of a motor vehicle illustrating the nominal and effective diameters of an underinflated tire.

Referring now to FIGS. 2 and 4, in the process step 84 the effective or operating diameter of each tire and wheel assembly 28L, 28R, 38L and 38R is computed, based upon the calculated or expected wheel speeds. This is a simple calculation based upon the distance traveled by the tire during one rotation, i.e., its circumference, divided by $\pi$ or an approximation thereof such as 3.14159. FIG. 4 presents an example wherein the left rear tire and wheel assembly 28L on a vehicle V is underinflated. While the tire has a nominal diameter or radius $R_N$ which represents its intended and normal operating diameter when properly inflated, because this tire is underinflated, its effective or operating diameter is a significantly smaller diameter or radius $R_E$ which is the distance from the center of the tire and wheel assembly 28L to the ground G defined by the rolling flat spot resulting from the underinflated condition, Upon the computation of the effective or operating diameter of each tire and wheel assembly 28L, 28R, 38L and 38R, the program 70 moves to a decision point 86 which compares the effective diameters of the tire and wheel assemblies 28L, 28R, 38L and 38R calculated during a previous iteration of the program 70 (if any) with currently calculated values. If the effective diameters of any of the tire and wheel assemblies 28L, 28R, 38L and 38R are increasing with increasing vehicle speed, this indicates that one (or more) of the assemblies 28L, 28R, 38L and 38R are underinflated. (As a tire and wheel assembly rotates faster, the mass of the tire and the increasing centrifugal force tends to enlarge the operating or effective diameter of the tire).

If the diameters of one or more of the tires is increasing with increasing vehicle speed, the decision point 86 is exited at YES and a process step 88 is entered which sets a flag which may provide this information to other systems, the CAN, or may light an indicator light. The flag of process step 86 will be reset to zero or OFF at the beginning of a new ignition cycle. If the effective diameters of all the tire and wheel assemblies 28L, 28R, 38L and 38R remain essentially constant with increasing vehicle speed, the decision point is exited at NO and the program 70 moves to a process step 92.

In the process step 92, the program 70 sets or updates each expected wheel speed based upon each calculated effective or operating tire diameter. The calculated values of the effective or operating tire diameters of each the tire and wheel assembly 28L, 28R, 38L and 39R will typically replace effective or operating tire diameters stored from the previous iteration or if the program 70 is on a first iteration of a new ignition cycle these values will be initial values.

The program 70 then moves to a decision point 94 which determine whether each of the four effective or operating diameters of the four tire and wheel assemblies 28L, 28R, 38L and 38R are within a first allowance or tolerance. This tolerance is empirically set or determined by various system tolerances, operating thresholds and sensitivities of the performance enhancing systems of the vehicle. If the diameters of all four tire and wheel assemblies 28L, 28R, 38L and 38R are within these established allowances or tolerances, the decision point 94 is exited at YES and the program 70 indicates that normal operation of such performance enhancing systems may occur. If the decision point 94 is not satisfied and is exited at NO, the program 70 moves to a second decision point 102 which determines whether all four tire diameters are within a second, wider allowance or tolerance. If all four tires satisfy this second, wider tolerance, the decision point 102 is exited YES and the program 70 indicates to associated devices through the line 68 and in a process step 104 that reduced function for example, reduced sensitivity or a wider operating bandwidth of performance enhancing systems is indicated. If the decision point 102 determines that the diameter of any of the tires is not within the second, broader allowance or tolerance range, the decision point 102 is exited at NO and the program 70 moves to a process step 106 which indicates that a system shutdown is required. In effect, this means that the effective diameters of one or more of the tire and wheel assemblies 28L, 28R, 38L and 38R diameters are so small or so large that the operation of associated performance enhancing systems will be compromised by the size disparity of one or more tires presently operating on the vehicle. Such tire size disparity may, of course, be the result of a mini-spare, an underinflated tire, an undersized tire, an undersized, underinflated tire, an oversized tire, an overinflated tire and an oversized, overinflated tire, for example.

The program 70 then reaches an end point 108. The program 70 may be and typically will be on a frequent cycle such as once every second or several times a minute repeated in order to provide updated data and monitor the condition of the vehicle tires or a real time basis.

The foregoing disclosure is the best mode devised by the inventors for practicing this invention. It is apparent, however, that methods incorporating modifications and variations will be obvious to one skilled in the art of motor vehicle control systems and software. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

We claim:

1. A method of detecting an anomalous tire on a motor vehicle comprising the steps of;
   providing a wheel speed sensor at each wheel of such vehicle,
   providing a steering angle sensor,
   sensing the rotational speed of each wheel and an angle of deflection of a steering component of such vehicle,
   calculating a nominal vehicle speed and an expected rotational speed for each vehicle wheel based upon said sensed rotational speeds and said steering angle,
   calculating the effective diameter of each tire based upon said rotational speeds and said vehicle speed, and
   determining whether each effective diameter of each tire is within a predetermined limit.

2. The method of detecting an anomalous tire on a motor vehicle of claim 1 wherein said predetermined limit includes a first region wherein unrestricted vehicle operation is permitted and a second region wherein restricted vehicle operation is required.

3. The method of detecting an anomalous tire on a motor vehicle of claim 2 wherein said predetermined limit includes a third region wherein system shutdown is required.

4. The method of detecting an anomalous tire on a motor vehicle of claim 1 wherein said steering angle sensor is associated with a steering column of said vehicle.

5. The method of detecting an anomalous tire on a motor vehicle of claim 1 further including the step of monitoring said calculated effective diameter of each of said tires over time to detect an underinflated tire.

6. The method of detecting an anomalous tire on a motor vehicle of claim 1 further including the step of comparing said measured and said expected rotational speeds of said wheels.

7. The method of detecting an anomalous tire on a motor vehicle of claim 1 wherein said wheel speed sensors are Hall effect sensors.

8. A method of detecting at least one non-standard sized tire on a four wheel motor vehicle comprising the steps of:
   sensing a speed of rotation of each tire,
   sensing an angle of deflection of a steering component of such vehicle,
   calculating a vehicle speed by averaging at least two of said tire speeds,
   calculating an expected rotational speed for each tire based upon said sensed rotational speeds and said sensed angle of deflection,
   calculating an operating diameter of each tire based upon said rotational speeds and said vehicle speed, and
   determining whether each operating diameter of each tire is within one of at least two predetermined ranges.

9. The method of detecting at least one non-standard tire on a four wheel motor vehicle of claim 8 wherein said predetermined ranges includes a first range wherein vehicle operation is unrestricted and a second operating range wherein certain vehicle activity is restricted.

10. The method of detecting at least one non-standard tire on a four wheel motor vehicle of claim 9 further including a third range wherein certain vehicle operation is precluded.

11. The method of detecting at least one non-standard tire on a four wheel motor vehicle of claim 8 wherein said steering component is a steering column.

12. The method of detecting at least one non-standard tire on a four wheel motor vehicle of claim 8 further including the step of comparing said senses and said expected rotational speeds of each tire and wheel assembly.

13. The method of detecting at least one non-standard tire on a four wheel motor vehicle of claim 8 further including the step of determining if said effective diameter of at least one of said tire and wheel assemblies is increasing with increasing vehicle speed.

14. A method of detecting a nonstandard tire on a motor vehicle comprising the steps of:
   sensing an angular velocity of each tire and wheel assembly,
   sensing an angle of deflection of a steering component,
   determining a vehicle speed by averaging at least two sensed angular velocities,
   determining an expected angular velocity of each tire and wheel assembly based on said vehicle speed and said angle of deflection,
   determining the effective diameter of each tire and wheel assembly and whether any of said effective diameters is outside a predetermined allowance.

15. The method of detecting a nonstandard tire on a motor vehicle of claim 14 wherein said steering component is a steering column.

16. The method of detecting a nonstandard tire on a motor vehicle of claim 14 further including the step of comparing said senses and said expected angular velocities of each tire and wheel assembly.

17. The method of detecting a nonstandard tire on a motor vehicle of claim 16 further including the step of setting a flag indicating the position of a tire having expected and measured speed outside a predetermined difference.

18. The method of detecting a nonstandard tire on a motor vehicle of claim 14 wherein said vehicle speed is determined by averaging said sensed angular velocities of all said tire and wheel assemblies.

19. The method of detecting a nonstandard tire on a motor vehicle of claim 14 further including the step of determining if said effective diameter of at least one of said tire and wheel assemblies is increasing with increasing vehicle speed.

20. The method of detecting a nonstandard tire on a motor vehicle of claim 14 wherein vehicle speed is determined by averaging said sensed angular velocities of said tire and wheel assemblies.

* * * * *